United States Patent
Cho et al.

(10) Patent No.: US 8,686,730 B2
(45) Date of Patent: Apr. 1, 2014

(54) SYSTEM FOR STREAMER ELECTRICAL RESISTIVITY SURVEY AND METHOD FOR ANALYSIS OF UNDERGROUND STRUCTURE BELOW A RIVERBED

(75) Inventors: Seong-Jun Cho, Daejeon (KR); Jung-Ho Kim, Daejeon (KR); Myeong-Jong Yi, Daejeon (KR); Jeong Sul Son, Daejeon (KR)

(73) Assignee: Korea Institute of Geoscience & Mineral Resources, Daejeon (KR)

( * ) Notice: Subject to any disclaimer, the term of this patent is extended or adjusted under 35 U.S.C. 154(b) by 271 days.

(21) Appl. No.: 13/228,160

(22) Filed: Sep. 8, 2011

(65) Prior Publication Data

US 2012/0029825 A1 Feb. 2, 2012

Related U.S. Application Data

(62) Division of application No. 12/280,429, filed on Aug. 22, 2008, now Pat. No. 8,067,941.

(30) Foreign Application Priority Data

Jan. 23, 2008 (WO) ................ PCT/KR2008/000423

(51) Int. Cl.
*G01V 3/12* (2006.01)
*G06F 19/00* (2011.01)
(52) U.S. Cl.
USPC .......................................... 324/323; 324/365
(58) Field of Classification Search
None
See application file for complete search history.

(56) References Cited

U.S. PATENT DOCUMENTS

| 2,531,088 A | 11/1950 | Thompson |
| 4,298,840 A | 11/1981 | Bischoff et al. |
| 4,617,518 A | 10/1986 | Srnka |

(Continued)

FOREIGN PATENT DOCUMENTS

| JP | 55144573 | 11/1980 |
| JP | 3092776 | 4/1991 |

(Continued)

OTHER PUBLICATIONS

Belaval, et al., "Continuous-Resistivity Profiling for Coastal Ground-Water Invesitgations: Three Case Studies", in Symposium on the Application of Geophysics to Engineering and Environmental Problems (SAGEEP), Apr. 6-10, 2003, San Antonio, Texas, Proceedings: Denver, Colorado, Environmental and Engineering Geophysics Society, CD-ROM, p. 14.

*Primary Examiner* — Vinh Nguyen
(74) *Attorney, Agent, or Firm* — Caesar, Rivise, Bernstein, Cohen & Pokotilow, Ltd.

(57) ABSTRACT

A system for measuring electrical resistivity survey checks a border of bedrock or a thickness of a sedimentary layer in a riverbed of a river or lake within a short time. A method for analysis of an underground structure of a riverbed using the same is also provided. The system for streamer electric resistivity survey using a survey boat includes a streamer cable connected to the survey boat and having a plurality of electrodes attached thereto, a multi-channel resistivity meter loaded on the survey boat to measure electric resistivity from the plurality of electrodes, a first RTK GPS (Real Time Kinematic Global Positioning System) loaded on the survey boat to measure a position of the survey boat in real time, and a second RTK GPS installed to a tail of the streamer cable to measure a position of the tail in real time.

3 Claims, 2 Drawing Sheets

(56) References Cited

U.S. PATENT DOCUMENTS

| | | |
|---|---|---|
| 5,841,026 A | 11/1998 | Kirk et al. |
| 6,236,211 B1 | 5/2001 | Wynn |
| 7,203,599 B1 | 4/2007 | Strack et al. |
| 7,386,402 B2 | 6/2008 | Bryant |
| 7,912,649 B2 * | 3/2011 | Harris et al. .................... 702/13 |
| 2006/0186887 A1 * | 8/2006 | Strack et al. ................. 324/336 |
| 2008/0068020 A1 * | 3/2008 | Tompkins .................... 324/335 |
| 2010/0226205 A1 | 9/2010 | Tulupov et al. |

FOREIGN PATENT DOCUMENTS

| | | |
|---|---|---|
| JP | 4273086 | 9/1992 |
| JP | 10293181 | 11/1998 |
| JP | 2003084069 | 3/2003 |
| JP | 2003228786 | 8/2003 |
| JP | 2005527824 | 9/2005 |
| JP | 2007285729 | 11/2007 |
| KR | 200422330 | 7/2006 |
| WO | 01/84186 | 11/2001 |

\* cited by examiner

SYSTEM FOR STREAMER ELECTRICAL RESISTIVITY SURVEY AND METHOD FOR ANALYSIS OF UNDERGROUND STRUCTURE BELOW A RIVERBED

CROSS REFERENCE TO RELATED APPLICATIONS

The present application is a divisional application and claims the benefit under 35 U.S.C. §121 of application Ser. No. 12/280,429, filed on Aug. 22, 2008 entitled SYSTEM FOR STREAMER ELECTRICAL RESISTIVITY SURVEY AND METHOD FOR ANALYSIS OF UNDERGROUND STRUCTURE BELOW A RIVERBED, now U.S. Pat. No. 8,067,941, which in turn claims the benefit under 35 U.S.C. §371 of International Application No. PCT/KR2008/000423 filed on Jan. 23, 2008, entitled SYSTEM FOR STREAMER ELECTRICAL RESISTIVITY SURVEY AND METHOD FOR ANALYSIS OF UNDERGROUND STRUCTURE BELOW A RIVERBED, and all of whose entire disclosures are incorporated by reference herein.

TECHNICAL FIELD

The present invention relates to a system for streamer electrical resistivity survey and a method for analysis of an underground structure below a riverbed, and more particularly to a system for measuring electrical resistivity survey on a water surface to check a border of bedrock or a thickness of a sedimentary layer in a riverbed of a river or lake, a system for electrical resistivity survey, which analyzes an underground structure by modeling the measured electrical resistivity, and a method for analysis of an underground structure of a riverbed using the same.

BACKGROUND ART

Checking a border of bedrock or a thickness of a sedimentary layer in a riverbed of a river or lake is essential to calculating a sediment yield for riverbed construction, ensuring the stability of bridge design, and optimizing excavation for canal design.

In order to check a border of bedrock, drilling is generally used. The drilling may give most exact data for borders of bedrock, sediment and weathered layer, but this method just gives depth information limited to the drilling spot and takes much time and cost for the drilling work.

As another method, GRP (Ground Penetrating Radar) survey or shallow survey may be applied, but they have the following problems. First, the GRP survey has a limitation in the depth of investigation according to electric conductivity of a river or lake, and particularly penetration of radar wave is limited in case a soil sedimentary layer has a low electric conductivity. Also, the shallow survey needs development of a suitable transmitting source, so it is also required to develop a receiver sensor accordingly.

Due to the above problems, the present invention is directed to applying an electric resistivity survey at water-covered area. Generally, the electric resistivity survey is conducted in a way of flowing a certain current to a conductor and then calculating a potential difference between predetermined two points to calculate resistivity between two points. That is to say, the electric resistivity survey is a geophysical method for intentionally flowing current into the ground to measure a potential difference and then calculating electric property distribution of an underground media to check a geological structure or anomaly, thereby imaging a geological structure that is complicatedly formed due to irregular media.

DISCLOSURE

Technical Problem

The above electric resistivity survey is generally used along an earth surface to check a geological structure under the ground. However, in case the electric resistivity survey is used at water-covered area, electric resistivity may be differently measured according to the change of electrode positions on the water, and this problem should be solved. Thus, for more exact analysis, electric resistivity data for the water according to a measured position is additionally needed such that only the underground structure is analyzed except for the undesired water portion.

The present invention is designed to solve the problems of the prior art, and therefore it is an object of the present invention to provide a system for electric resistivity survey, which may check a thickness of sedimentary layer and a border of bedrock below a river or lake with higher accuracy in a short time by measuring electric conductivity of water in the river or lake as well as electric resistivity according to the change of electrode positions on the water in real time; and a method for analysis of an underground structure below a riverbed.

Technical Solution

In order to accomplish the above object, the present invention provides a system for streamer electric resistivity survey, which surveys an underground structure below a riverbed using a survey boat, the system comprising: a streamer cable connected to the survey boat and having a plurality of electrodes attached thereto; a multi-channel resistivity meter loaded on the survey boat to measure electric resistivity from the plurality of electrodes attached to the streamer cable; a first RTK GPS (Real Time Kinematic Global Positioning System) loaded on the survey boat to measure a position of the survey boat in real time; and a second RTK GPS installed to a tail of the streamer cable to measure a position of the tail of the streamer cable in real time.

The survey boat may further include a conductivity meter mounted to a lower portion of the survey boat to measure an electric conductivity of water; and a side scan sonar mounted to the lower portion of the survey boat to measure a water depth.

Using the present invention, it is possible to provide a new survey system capable of analyzing an underground structure below a riverbed within a short time by measuring electric conductivity of a riverbed and limit condition data (e.g., water depth, water temperature and electric conductivity of water) of the river water according to changing positions using position information obtained by RTK GPS.

In the present invention as mentioned above, the streamer cable preferably has a tail buoy connected to the tail thereof such that the streamer cable is kept in a linear state, and buoys are preferably installed to the streamer cable among the plurality of electrodes such that the electrodes are floating in contact with water.

In addition, the second RTK GPS preferably has a radio modem by which position information of the tail of the streamer cable may be transmitted to the survey boat, and the transmitted position information of the tail of the streamer cable is calculated with the position information of the survey boat measured by the first RTK GPS to provide a precise measurement position.

In addition, the system for streamer electric resistivity survey according to the present invention may further include an operating device to which measurement data is input, the operating device imaging an underground structure below a riverbed by means of electric resistivity inversion.

The operating device executes: generating GIS (Geographic Information System) data from the electric conductivity measured by the conductivity meter and the water depth measured by the side scan sonar using the position data measured by the first RTK GPS; calculating precise GPS data of the measurement position from the position data measured by the first RTK GPS and the position data measured by the second RTK GPS; and conducting two-dimensional inversion to the electric resistivity data measured by the multi-channel resistivity meter based on the GPS data of the measurement position, and imaging an underground structure below a riverbed using the inversion result.

At this time, when the operating device conducts two-dimensional inversion to the measured electric resistivity data, the water depth data and the electric conductivity data of water are input thereto as limit conditions.

By using the above operating device, it is possible to image an underground structure below a riverbed, and accordingly it is possible to easily check a thickness of sedimentary layer and a border of bedrock in the riverbed.

In addition, in order to accomplish the above object, the present invention provides a method for analysis of an underground below a riverbed using the measured data at an operating device that includes a memory, a data operator, an underground structure analyzer, and a controller, the method comprising: (c) the data operator reading position data of a survey ship and position data of a tail of a streamer cable from the memory to generate precise measurement position data; (d) the underground structure analyzer conducting two-dimensional inversion to the measured electric resistivity data according to the precise measurement position data; and (e) the underground structure analyzer imaging an underground structure below a riverbed using the inversion result, and, in the step (d), a water depth and an electric conductivity of water are input as limit conditions.

In another aspect of the present invention, there is also provided a method for analysis of an underground below a riverbed using the measured data at an operating device that includes a memory, a data operator, an underground structure analyzer, and a controller, the method comprising: (a) the data operator reading electric conductivity data of water and position data of a survey ship from the memory to generate an electric conductivity map of water according to position; (b) the data operator reading water depth data and the position data of the survey ship from the memory to generate a water depth map according to position; (c) the data operator reading the position data of the survey ship and position data of a tail of a streamer cable to generate precise measurement position data; (d) the underground structure analyzer conducting two-dimensional inversion to the measured electric resistivity data according to the precise measurement position data; and (e) the underground structure analyzer imaging an underground structure below a riverbed using the inversion result.

In the step (d), the electric conductivity data of water according to position obtained in the step (a) and the water depth data according to position obtained in the step (b) are input as limit conditions.

Using the above method, data related to water level and electric conductivity of water according to position are inserted as limit conditions during the inversion, so the inversion may be conducted only for the underground structure below a riverbed, which allows to give very high accuracy rather than the inversion including river water.

Advantageous Effects

As described above, in analyzing an underground structure below a riverbed based on a measured electric resistivity, the present invention allows to rapidly measure data of river water and electric resistivity of changing positions at the same time using real-time position information obtained by RTK GPS, and also to give exact analysis results by decreased error obtained by inputting electric conductivity and water depth at each position as limit conditions during inversion.

That is to say, the present invention makes it possible to check a thickness of sedimentary layer and a border of bedrock below a riverbed of a river or lake exactly within a short time.

Figure 1:
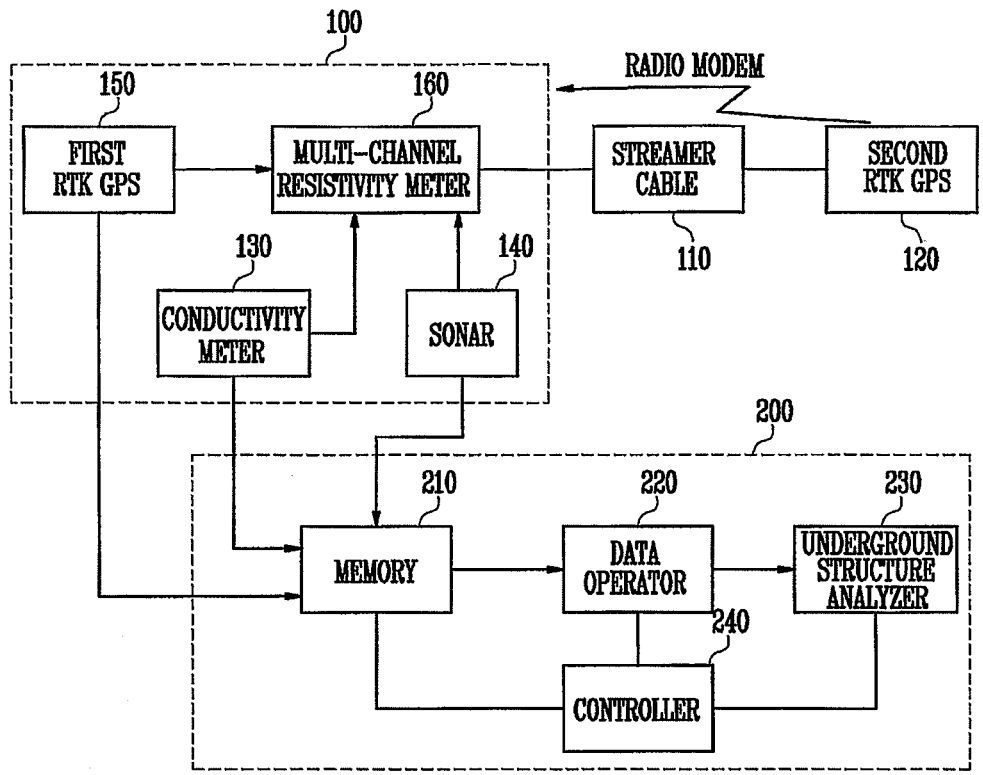
FIG. 1 is a block diagram showing a system for streamer electric resistivity survey according to one embodiment of the present invention.

<Reference Numerals of Essential Parts in the Drawings>

| | |
|---|---|
| 100: survey boat | 110: streamer cable |
| 112: electrode | 114: buoy |
| 116: tail buoy | 120: second RTK GPS |
| 130: conductivity meter | 140: side scan sonar |
| 150: first RTK GPS | 160: multi-channel resistivity meter |
| 200: operating device | 210: memory |
| 220: data operator | 230: underground structure analyzer |
| 240: controller | |

BEST MODE

Hereinafter, preferred embodiments of the present invention will be described in detail with reference to the accompanying drawings.

The present invention is not limited to the following embodiment, but it may be implemented in other ways. Rather, the embodiment introduced below is just for better understanding of the spirit of invention to those having ordinary skill in the art, such that the following disclosure would becomes more thorough and perfected.

Figure 2:
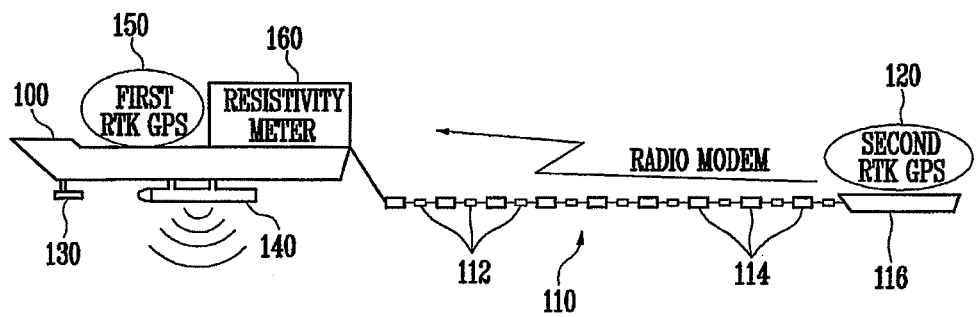
FIG. 2 is a schematic view showing a device applied to the system for streamer electric resistivity survey according to one embodiment of the present invention.

FIG. 1 is a block diagram showing a system for streamer electric resistivity survey according to one embodiment of the present invention, and FIG. 2 shows a device for the system.

The system for streamer electric resistivity survey according to the present invention includes a survey boat 100 on which various measuring equipment is loaded, and a streamer cable 110 to which a plurality of electrodes are attached.

A multi-channel resistivity meter 160 and a first RTK GPS (Real Time Kinematic Global Positioning System) 150 are loaded on the survey boat 100, and a conductivity meter 130 and a side scan sonar 140 may be installed to a lower portion of the survey boat 100.

The multi-channel resistivity meter 160 measures electric resistivity, transmitted from the plurality of electrodes attached to the streamer cable 110, together in multi channels, and the first RTK GPS 150 measures a position of the survey boat in real time with centimeter level.

The conductivity meter 130 mounted to the lower portion of the survey boat inside water measures electric conductivity of water, and the side scan sonar 140 measures a water depth of a river or lake using ultrasonic waves. Here, the measured water depth and electric conductivity are used as limit conditions during inversion.

Generally, in case an underground structure is checked using inverse operation after electric resistivity survey, the entire lower area of electrodes is subject to the inversion. In case the survey is conducted using electrodes floating on a river as in the present invention, the river and the entire geological layer below it are all subjected to the inversion. However, in case the river and the entire geological layer below it are all subjected to the inverse operation, there occur serious errors in analysis of an targeted underground structure below a riverbed of a river. Thus, in the inversion mode, depth and electric resistivity (a reciprocal of electric conductivity) of water are put as fixed values, and inversion is conducted only to a geological layer in the river using the electric resistivity measurement result. In this case, better accuracy is ensured rather than the case of conducting inversion including the water.

For this purpose, there are needed data for depth and electric conductivity (a reciprocal of electric resistivity) of the water to be used as limit conditions during the inversion. In the present invention, the conductivity meter 130 and the side scan sonar 140 are mounted to the lower portion of the survey boat 100, so water depth and electric conductivity of water to be used as limit conditions for inversion are measured together, thereby ensuring rapid and accurate analysis of an underground structure below a riverbed.

Such electric conductivity and water depth data of the river may be replaced with data separately measured regardless of the survey system of the present invention. In this case, the conductivity meter and the side scan sonar may not be mounted to the survey system of the present invention.

The plurality of metal electrodes 112 for measuring electric resistivity are attached to the streamer cable 110 connected to the survey boat 100, and small buoys 114 are installed among the plurality of electrodes such that the electrodes 112 are floating in contact with water. A tail buoy 116 is connected to a tail of the streamer cable 110 such that the streamer cable is kept in a linear state, and a second RTK GPS 120 is installed to the tail buoy 116 to measure an accurate position of the tail of the streamer cable in real time. In addition, the second RTK GPS 120 is provided with a radio modem by which position information is transmitted, to the survey boat 100, and the position information is recorded together with the position of the survey boat 100, measured by the first RTK GPS 150.

In addition, the system for streamer electric resistivity survey according to the present invention may further include an operating device 200 to which the measurement data is input. The operating device 200 images an underground structure below a riverbed by means of electric resistivity inversion. This operating device 200 may be directly loaded to the survey boat 100 to show an image of the underground structure below a riverbed in real time according to the survey data, and the operating device 200 may also be not loaded on the survey boat 100 such that the underground structure below a riverbed may be imaged separately on the ground based on the stored measurement data.

The operating device 200 may include a memory 210, a data operator 220, an underground structure analyzer 230 and a controller 240. The memory 210 stores various measurement data. The data operator 220 reconfigures the measurement data into position data that may be applied to analysis of an underground structure. The underground structure analyzer 230 conducts two-dimensional inversion based on the electric resistivity data and images an underground structure based on analysis results of a final underground electric resistivity model. The controller 240 controls the above operating process.

Figure 3:
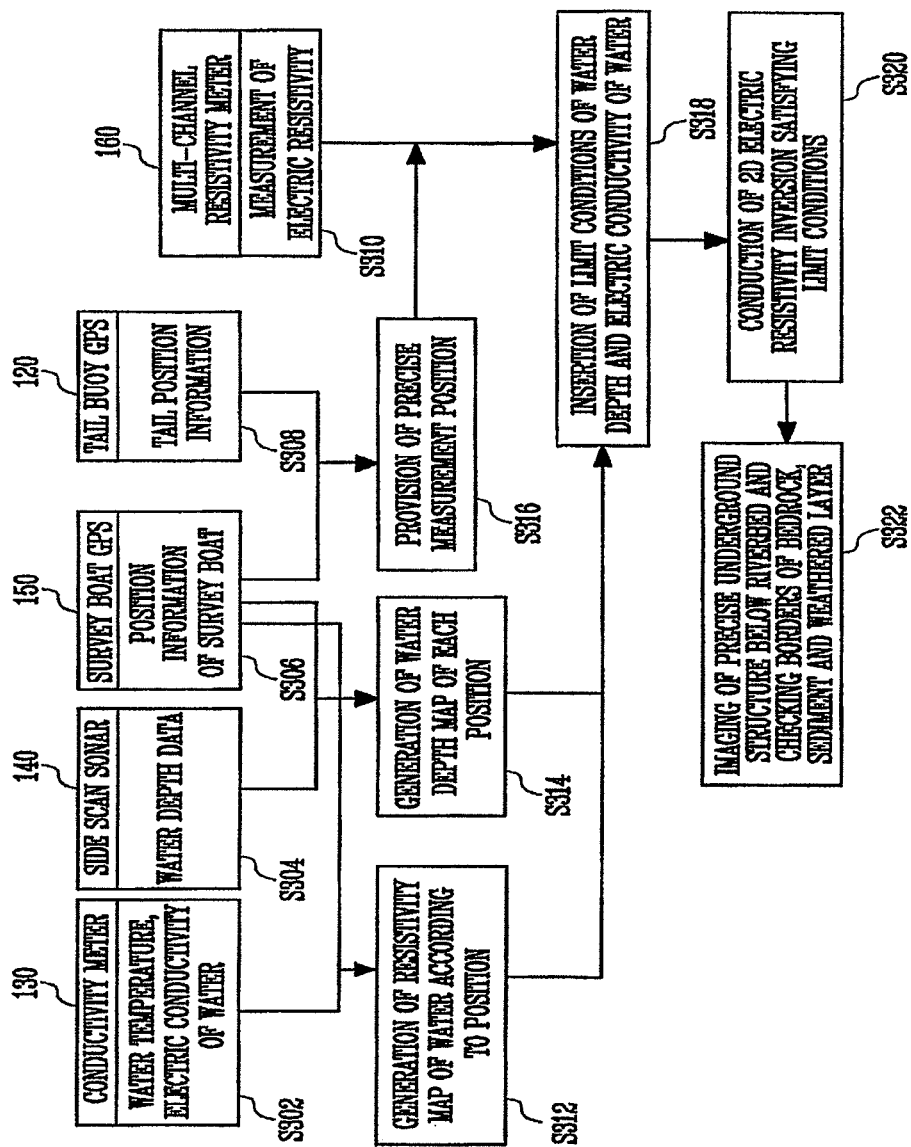
FIG. 3 is an algorithm for analyzing an underground structure below a riverbed using the system for streamer electric resistivity survey according to one embodiment of the present invention.

The operating device 200 executes the following steps using an algorithm shown in FIG. 3 in order to image an underground structure below a riverbed.

First, the data operator generates GIS (Geographic Information System) data from the electric conductivity data of water measured by the conductivity meter 130 and the water depth data measured by the side scan sonar 140 by using the GPS data. That is to say, the data operator 220 executes (a) reading electric conductivity data of water and position data of the survey ship from the memory to generate an electric conductivity map of water according to position (Step S312), and reading water depth data and position data of the survey ship from the memory 210 to generate a water depth map according to position (Step S314).

Then, GPS data of a precise measurement position is calculated using the position data measured by the first RTK GPS 150 and the position data measured by the second RTK GPS 120. That is to say, the data operator 220 executes (c) reading position data of the survey ship and position data of the tail of the streamer cable to generate precise measurement position data (Step S316). In this way, precise position data for measurement position of each electrode may be calculated based on the position data of the first RTK GPS and the position data of the second RTK GPS.

Then, two-dimensional inversion is conducted to the electric resistivity data, measured by the multi-channel resistivity meter 160, based on the GPS data of the measurement position. That is to say, the underground structure analyzer 230 executes (d) conducting two-dimensional inversion to the measured electric resistivity data according to the precise position data (Step S320), and (e) imaging an underground structure below a riverbed using the inversion result (Step S322).

At this time, in the step (d), the electric conductivity data of water according to position obtained in the step (a) and the water depth data according to position obtained in the step (b) are input as limit conditions.

Using the inversion step S320, analysis results of a final underground electric resistivity model may be derived, an underground structure below a riverbed may be imaged using the analysis results, and a thickness of sedimentary layer and a border of bedrock below a riverbed may be easily checked by analyzing the image. In particular, in the inverse operation step S320, since data for water depth and electric conductivity of water according to position are inserted as limit conditions, it is possible that the inversion is conducted only for an underground structure below a riverbed, which ensures much higher accuracy rather than inversion including the river water.

In the analysis of electric resistivity survey data, the inversion is conducted in a way of calculating a theoretical potential or an apparent resistivity of each measurement point for an assumed underground electric resistivity model, correcting the underground electric resistivity model such that the theoretical value approximates to the measured survey data, and repeatedly conducting the same. If a difference between the theoretical value and the measurement value is sufficiently decreased, it may be considered as being converged, and at this time an underground structure is imaged based on the analysis result of the final underground electric resistivity model. Such inversion and imaging processes are conducted using an analysis software configured based on the above algorithm.

The electric conductivity of water and the water depth inserted during the inversion step S320 may be measured separately from the survey system of the present invention, and other stored data in GIS format may be used. In this case, among the above steps, the step (a) (S312) and the step (b) (S314) may be not executed.

MODE FOR INVENTION

Hereinafter, operations of the system for streamer electric resistivity survey, configured as above according to the present invention will be explained. The survey boat 100 moves to a target survey spot, floats the streamer cable 110 on the water, and applies current to the electrodes 112 attached to the streamer cable 110 in contact with water. This current is applied into the water through the electrodes 112, and this current is flowed to other electrodes 112 through current paths.

At this time, an isoelectric line with a potential obtained perpendicular to the current paths is obtained, and this isoelectric line is extended to the water surface, so a difference of isoelectric lines among the electrodes 112, namely a potential difference, is measured, and then the data is inversely input to the multi-channel resistivity meter 160. Thus, using the current amount flowed to the electrodes 112 and the measured potential difference, it is possible to find an accurate real electric resistivity of a homogeneous underground media.

In addition, if there exists any material with different electric resistivity, the current is flowed more to a material with a lower electric resistivity, thereby causing a change to the isoelectric line perpendicular to the path, which also gives an influence to the potential difference measured on the water surface. Thus, from the above, it is possible to obtain an apparent electric resistivity having information related to an electrically anomaly of the underground media by using the potential difference measured on the water surface. Using these data, it is possible to obtain an underground electric resistivity structure.

In addition, as mentioned above, for exact analysis of an underground structure below a riverbed, it is required to insert the electric resistivity data of water as a limit condition during the inversion. For this purpose, electric conductivity of water and water depth are measured using the conductivity meter 130 and the side scan sonar 140 mounted to the lower portion of the survey boat.

A water temperature sensor is attached to the conductivity meter 130 to measure water temperature together with electric conductivity of water. It is because activity of ions in water is changed according to the water temperature, and thus the electric conductivity is also changed.

The side scan sonar 140 sends ultrasonic waves into the water and then receives ultrasonic waves reflected on the riverbed, thereby measuring a water depth.

The electric conductivity and depth data of water, measured as above, are added with the GPS data of the survey boat and then stored as GIS data, and then they are input as limit conditions when electric resistivity inversion operating according to a measurement position.

As mentioned above, the present invention allows rapid and accurate analysis of an underground structure below a riverbed since water depth and electric conductivity are measured together, and then they are inserted as limit conditions for inversion.

The embodiments of the present invention are disclosed in the drawings and the specification. However, specific terms used herein are not intended to limit the scope of the present invention defined in the appended claims but to give better explanation of the present invention. Therefore, a person having ordinary skill in the art will understand there may be made various modifications and equivalents from the embodiments. Thus, the sincere scope of the present invention should be defined by the technical spirit of the appended claims.

INDUSTRIAL APPLICABILITY

The system for streamer electric resistivity survey and the method for analysis of an underground structure below a riverbed using the same according to the present invention may be applied to analysis of an underground structure such as a border of bedrock below a riverbed.

The invention claimed is:

1. A method for analysis of an underground below a riverbed using measured data at an operating device that includes a memory, a data operator, an underground structure analyzer, and a controller, the method comprising:
   (a) the data operator reading position data of a survey ship and position data of a tail of a streamer cable from the memory to generate precise measurement position data;
   (b) a multi-channel resistivity meter of survey boat measuring electric resistivity data transmitted from the plurality of electrodes attached to the streamer cable;
   (c) the underground structure analyzer conducting two-dimensional inversion to the measured electric resistivity data according to the precise measurement position data; and
   (d) the underground structure analyzer imaging an underground structure below a riverbed using the inversion result,
   wherein, in the step (c), a water depth data and an electric conductivity data of water are input as limit conditions.

2. The method of claim 1, further comprising:
   (e) the data operator reading the electric conductivity data of water and the position data of the survey ship from the memory to generate an electric conductivity map of water according to position.

3. The method of claim 2, further comprising:
   (f) the data operator reading the water depth data and the position data of the survey ship from the memory to generate a water depth map according to position.

* * * * *